United States Patent [19]

Whelan, Jr.

[11] 3,998,783

[45] Dec. 21, 1976

[54] FLAME RETARDANT POLYMER COMPOSITIONS

[75] Inventor: William Paul Whelan, Jr., Woodbury, Conn.

[73] Assignee: Uniroyal, Inc., New York, N.Y.

[22] Filed: Dec. 11, 1975

[21] Appl. No.: 639,942

Related U.S. Application Data

[62] Division of Ser. No. 396,632, Sept. 12, 1973, Pat. No. 3,956,139.

[52] U.S. Cl. .............. 260/45.75 A; 260/45.75 B; 260/45.75 D; 260/45.75 K; 260/45.75 T; 260/45.7 P; 260/45.7 S; 260/45.7 R; 260/45.75 P; 260/45.75 M; 260/45.75 N; 260/45.85 T

[51] Int. Cl.² .................... C08K 5/59; C08K 5/53; C08K 5/42; C08K 3/30

[58] Field of Search ............ 260/45.75 N, 45.75 M, 260/45.75 P, 45.7 R, 45.7 P, 45.7 S, 45.85 T, 45.75 B, 45.75 D, 45.75 T, 45.75 A, 45.75 K

[56] References Cited

UNITED STATES PATENTS

| 1,804,417 | 5/1931 | Herting | 252/8.1 |
|---|---|---|---|
| 2,381,487 | 8/1945 | Cook | 117/137 |
| 3,030,487 | 4/1962 | Hosch | 260/30.6 |
| 3,239,482 | 3/1966 | Rapp | 260/45.75 |
| 3,370,029 | 2/1968 | Cannelongo | 260/28.5 |
| 3,475,372 | 10/1969 | Gable | 260/45.75 |

*Primary Examiner*—V. P. Hoke
*Attorney, Agent, or Firm*—Willard R. Sprowls

[57] ABSTRACT

Polymers are flame-retarded by novel combinations of additives comprising:

a. a specified compound of iron, cobalt, nickel, tin or antimony, b. an alkali metal chloride, bromide or iodide, and c. an organic acid or inorganic acid salt. Alternatively, additive (c) may be an integral part of the polymer in whole or in part.

7 Claims, No Drawings

FLAME RETARDANT POLYMER COMPOSITIONS

This is a division of application Ser. No. 396,632, filed Sept. 12, 1973 now U.S. Pat. No. 3,956,139.

This invention is directed to novel combinations of additives which have the effect of flame-retarding polymers in which they are incorporated.

The use of halogen compounds as flame retardant additives for a broad spectrum of polymers is well known. Significant retardant activity has been limited, however, to those halogen compounds which are volatile, unstable or reactive at polymer combustion temperatures. Organic chlorine and bromine compounds typically fill the retardant requirement and are widely used as polymer flame retardants. The volatility and instability of these compounds to heat and light, however, have often imposed serious limitations on polymer processing conditions and final properties.

It is also well known that the retardant activity of organic halogen compounds can be greatly enhanced by the use of certain metallic synergists, of which antimony oxide is the best known and most widely used. Such use of synergists, however, frequently accentuates the deficiencies associated with the use of organic halogen compounds.

Effective use of non-volatile, thermally stable halogen compounds as flame retardants has been limited to a few reactive types, such as halides of zinc, cadmium and lead, which react advantageously with specific polymers during combustion. No way has previously been found to obtain a high degree of flame retardant activity with halogen compounds which are stable, non-volatile and unreactive toward the polymer. These include halogen compounds of the widest availability, such as the common alkali halides. Such compounds normally behave as inert fillers during polymer combustion, thereby providing a very low degree of flame retardancy.

EXPOSITION OF THE INVENTION

It has now been found that polymers may be effectively flame retarded by a 3-component additive combination comprising:

a. a compound of iron, cobalt, nickel, tin or antimony, b. an alkali metal chloride, bromide or iodide, and c. an acid which may be an integral part of the polymer in whole or in part or an inorganic acid salt.

These combinations are found to be synergistic in their flame-retarding effect, providing a total effect significantly greater than the sum of the contributions of the three components used individually or in pairs. Thus, while alkali halides provide only minor flame retarding effects when used alone or in combination with (a) or (c), they provide major effects in combination with both (a) and (c). Further, (a) and (c), used individually or in combination, produce relatively minor effects in the absence of the halide.

It is a further advantage of this invention that all three components may be selected from materials which are substantially non-volatile (i.e., they are not subject to significant loss (loss to an extent which would impair their effectiveness) by volatilization during or after processing of the polymer), substantially stable to atmospheric moisture and stable at conventional polymer processing temperatures. In addition, the practice of this invention permits the effective flame-retardant use of halogen compounds which are non-toxic.

Polymers which may be flame retarded in accordance with this invention are hydrocarbon polymers, nitrile-containing polymers, carboxylic-containing polymers and carboxylate ester-containing polymers. Typical examples of these polymers include polyolefin plastics, such as polyethylene, polypropylene and similar plastic polymers or copolymers of $\alpha$-olefins of the ethylene series, polystyrene, polyisobutylene, elastomers based on conjugated dienes, including homopolymers of butadiene (emulsion-prepared or solution-prepared), isoprene (natural rubber or synthetic cis-polyisoprene) and copolymers of such dienes with copolymerizable ethylenically unsaturated monomers such as styrene, e.g., SBR (solution-prepared or emulsion-prepared), ethylene-propylene copolymer rubbers and ethylene-propylene-non-conjugated diene (e.g., dicyclopentadiene, 1,4-hexadiene, methylene norbornene) terpolymer rubbers, poly-4-methyl pentene-1 and polymers of other substituted butenes, pentenes, hexenes, etc.; copolymers of hydrocarbon dienes with copolymerizable ethylenically unsaturated monomers such as acrylonitrile, e.g., NBR, styrene-acrylonitrile resins, ABS plastics (whether mixtures of styrene-acrylonitrile resin with butadiene-acrylonitrile rubber or with a graft copolymer of styrene and acrylonitrile on polybutadiene or butadiene-styrene copolymer); polymers and copolymers of acids such as maleic acid, fumaric acid, acrylic acid, methacrylic acid and itaconic acid; polymethacrylates and polyacrylates.

Compound (a) is selected from the oxides, sulfates, carbonates, acetylacetonates and carboxylates of iron, cobalt, nickel, tin and antimony, or the bis-cyclopentadienyl compounds of iron, cobalt and nickel, although the oxides, sulfates and acetylacetonates are the preferred metallic compounds for use in this invention. The carboxylates are the salts of saturated or unsaturated mono- or poly-carboxylic acids of aliphatic, alicyclic, aromatic, heterocyclic, polycyclic, or mixed types having up to 20 carbon atoms. Substituents may also be present provided that they do not interfere with the fire-retardant activity of the combination of (a), (b) and (c). Such substituents preferably do not include halogen, in order that the aforementioned deficiencies of organic halogen compounds may be avoided. Carboxylates relatively high in metal content are preferred. Examples of suitable carboxylates include acetate, oxalate, tartrate and citrate. The preparation and properties of the bis-cyclopentadienyl compounds are reported in Kirk-Othmer, Encyclopedia of Chemical Technology, 2nd Ed., Vol. 6, pp. 696–698, and in the review articles cited therein, all of which are incorporated by reference herein.

Both anhydrous and hydrous forms of compound (a) are operable. Likewise, normal, basic and acidic forms, e.g., basic ferric acetate, acid oxalates and the like, may be employed. The degree and amount of such acidity or basicity must, however, be taken into account in determining the requisite amount of compound (c), described below, to be used.

The metallic compound is used in amounts which are approximately 5 to 100% by weight of the amount which is chemically equivalent to the halogen atoms present. For example, the amount of ferric oxide chemically equivalent to the halogen atoms present in a composition containing 0.075 gram-formula weight of an alkali halide would be $$\frac{.075}{2 \times 3} \times 159.7 = 2.0 \text{ grams,}$$

where 2 is the number of iron atoms in each $Fe_2O_3$ formula, 3 is the valency of each iron atom and 159.7 is the formula weight of $Fe_2O_3$. Amounts appreciably in excess of chemical equivalency contribute little to the flame retardancy. Preferably, an amount ranging from 25% to 75% of the equivalent amount is employed. Mixtures or mixed salts of the metallic compounds may also be employed.

Halide (b) is an alkali metal chloride, bromide or iodide. The amount of halide employed in the practice of this invention is not critical but will depend on the balance desired between degree of flame retardation and other properties. Flame retardation will normally increase as larger amounts of halide are employed, while other properties likewise depart further from those of the unretarded composition. While a loading of 0.075 gram-mole of halide per hundred grams of polymer has been found suitable, greater or lesser amounts may be employed without departing from the spirit of this invention. Normally, a minimum of about 0.003 gram-mole of halide per hundred grams of polymer will be required for significant flame retardancy. For a given degree of flame retardancy, the amount required will depend on the choice of specific components. Mixtures of halides may also be used.

Component (c) is an organic acid, or an inorganic acid salt, having an acid ionization constant in excess of $10^{-6}$ and which is substantially non-volatile at conventional polymer processing temperatures. As stated above, an acid which is substantially non-volatile is not subject to significant loss (loss to an extent which would impair its effectiveness) by volatilization during or after processing of the polymer. In general, acids containing relatively high concentrations of acid moieties within the molecule, and having melting points below their vaporization and decomposition temperatures, are more effective and are preferred. Examples of suitable organic acids are acids such as succinic, glutaric, adipic, pimelic, suberic, tartaric, m-phthalic and citric acids, mono- and dialkyl phosphonic and phosphoric acids, such as methylphosphonic acid and diethyl phosphate, and sulfonic acids. Examples of operable inorganic acid salts are bisulfates such as potassium bisulfate.

The amount of component (c) should range from about 25% to 325% by weight, based on chemical equivalency to the sum of the amounts of compound (a) and halide (b). The amount of component (c) is adjusted in the case (i) in which the organic polymer is a carboxylic-containing polymer so that the carboxylic content of such polymer together with the amount of component (c) provide the stated chemical equivalency. In this situation, component (c) is omitted when the equivalency requirement is met by the polymer alone. The amount of component (c) is based only on equivalency with the amount of halide (b) in the case (ii) in which compound (a) is a salt of an acid having the same ionization constant as or a higher ionization constant than that of component (c). The preferred amounts of component (c) are between 75% and 200% by weight of the indicated chemical equivalency. Larger amounts than 325% by weight of such equivalency contribute little or nothing additional to flame retardancy and are generally deleterious to other properties. Smaller amounts than 25% by weight of such equivalency contribute little to flame retardancy. Mixtures of acids may also be employed.

In order to illustrate the method of determining the indicated chemical equivalency, the amount of succinic acid chemically equivalent to the sum of compounds (a) and (b) in a composition containing 0.075 gram-formula weight of an alkali halide and one gram of ferric oxide would be $$\left[ .075 + \frac{1 \times 2 \times 3}{159.7} \right] \times \frac{118.1}{2} = 6.65 \text{ gr.}$$

where 2, 3 and 159.7 in the first fraction are, respectively, the number of iron atoms in each $Fe_2O_3$ formula, the valency of each iron atom, and the formula weight of $Fe_2O_3$, and 118.1 and 2 in the second fraction are, respectively, the molecular weight of succinic acid and the number of acidic moieties having an ionization constant greater than $10^{-6}$ in each succinic acid molecule. As an example of case (ii), the amount of citric acid monohydrate which is chemically equivalent to the halide alone in a composition containing 13.1 gr. potassium iodide and 3.7 gr. ferrous sulfate ($HSO_4^-$ being a stronger acid than the strongest acid group in citric acid) would be $$\frac{13.1}{166.0} \times \frac{210.1}{3} = 5.5 \text{ gr.}$$

where 166.0 is the formula weight of potassium iodide, and 210.1 and 3 are, respectively, the molecular weight of the acid and the number of acid moieties having an ionization constant greater than $10^{-6}$ in each acid molecule.

The flame retardant components are incorporated into the polymer by conventional polymer compounding techniques. The order to mxing is not critical to the performance of the invention, but it is generally preferred that compound (a) be incorporated with, or prior to, halide (b) and/or component (c). If desired, the components may be incorporated into the polymer in amounts larger than those desired for the final composition and the resulting masterbatch is combined subsequently with additional polymer.

It is also clear that any amount of polymer smaller than that desired for the final composition may be combined with the components by suitable techniques, the resulting fire-retardant concentrate (or masterbatch) being combined subsequently with additional polymer in the conventional manner. Such a procedure can be useful in facilitating dispersion of the fire-retardant components in the final composition. Typically, the amount of polymer in the concentrate will range approximately from 10 to 75% of the total weight of concentrate. With reference to the concentrate, it is of course also possible to substitute for the polymer, in whole or in part, such other polymers as will be suitable to the processing and properties of the final composition and will not prevent operation of the fire-retardant system. Other processing aids and/or other indredients which meet the same requirements may be included in the concentrate in addition.

The operation of this invention in the flame retardation of ABS polymer is illustrated in the examples below. Compounding of the ABS, polystyrene, acrylic resin and polypropylene test specimens was carried out in a conventional manner on a rubber/plastics mill. Slab specimens were compression molded, and were cut to size and finished as specified in ASTM D-2863. The ABS polymer was a gum plastic containing 22% acrylonitrile, 23% butadiene and 55% styrene.

Testing of specimens was carried out by ASTM Method D-2863, "Flammability of Plastics Using the Oxygen Index Method". Oxygen Index is the minimum concentration of oxygen, expressed as percent by volume, in a slowly rising mixture of nitrogen and oxygen, that will just support the combustion of a material burning under equilibrium conditions of candle-like burning. Thus, higher Oxygen Index indicates decreased relative flammability. Since the method provides a continuous numerical scale for the assignment of relative flammability ratings, it is especially appropriate for illustrating differences in the degree of flame retardation provided by additives and additive combinations. Specimens of the ABS polymer itself have an Oxygen Index of 18.5. "ΔOI" values shown in the examples represent the increases in Oxygen Index obtained with the specified additive-containing composition relative to the Index of the ABS and other polymers. Parts of additives shown are parts by weight per hundred parts of polymer. Moles are parts divided by formula weight.

EXAMPLE 1

The following demonstrates the operability of alkali halides, when used in combination with acidic and metallic components, in reducing the flammability (increasing the Oxygen Index) of ABS polymer. Powdered mixtures of the components, incorporated in ABS in the amounts indicated, gave the ΔOI's shown:

| Halide | Parts | Moles | Acid | Parts | Moles | Metal Cpd. | Parts | Moles | ΔOI |
| --- | --- | --- | --- | --- | --- | --- | --- | --- | --- |
| (a) Potassium Iodide | 12.5 | .075 | succinic | 13.3 | .113 | Ferric Oxide | 1 | .006 | +4.9 |
| (b) Sodium Bromide | 7.8 | .075 | succinic | 13.3 | .113 | Ferric Oxide | 1 | .006 | +2.9 |
| (c) Sodium Chloride | 4.4 | .075 | succinic | 13.3 | .113 | Ferric Oxide | 1 | .006 | +1.9 |

In contrast to ABS polymer, which after ignition burned continuously at oxygen concentrations of 18.5% and higher, compositions (a), (b) and (c) were self-extinguishing at oxygen concentrations below 23.4, 21.4 and 20.4%, respectively.

When powdered mixtures with one component omitted, as indicated, were incorporated in ABS, the following results were obtained:

| Halide | Parts | Moles | Acid | Parts | Moles | Metal Cpd. | Parts | Moles | ΔOI |
| --- | --- | --- | --- | --- | --- | --- | --- | --- | --- |
| (d) Potassium Iodide | 12.5 | .075 | succinic | 13.3 | .113 | None | — | — | +0.6 |
| (e) Potassium Iodide | 12.5 | .075 | None | — | — | Ferric Oxide | 1 | .006 | +1.3 |
| (f) None | — | — | succinic | 13.3 | .113 | Ferric Oxide | 1 | .006 | +0.7 |

Additional ABS control compositions with the following ingredients gave the results shown:

| Halide | Parts | Moles | Acid | Parts | Moles | Metal Cpd. | Parts | Moles | ΔOI |
| --- | --- | --- | --- | --- | --- | --- | --- | --- | --- |
| (g) Sodium Chloride | 5 | .086 | None | — | — | None | — | — | +0.1 |
| (h) None | — | — | succinic | 10.1 | .086 | None | — | — | +0.2 |
| (i) None | — | — | None | — | — | Ferric Oxide | 1 | .006 | +1.1 |
| (j) Sodium Chloride | 5 | .086 | succinic | 10.1 | .086 | None | — | — | +0.1 |

The ΔOI comparisons: $(a) > (d) + (i)$, $(a) > (e) + (h)$, $(c) > (f) + (g)$, $(c) > (i) + (j)$ and $(c) > (g) + (h) + (i)$ illustrate the synergism of the 3-component combinations, which provide ΔOI's in excess of the sum of the contributions of the components used in the same or similar amounts in other combinations.

Examples 2, 3 and 4 illustrate the operability of a variety of organic acids or inorganic acid salts as the acid component.

EXAMPLE 2

Successive addition of powdered components, in the order indicated, to ABS polymer, gave the results shown:

| Metal Cpd. | Parts | Moles | Halide | Parts | Moles | Acid | Parts | Moles | ΔOI |
| --- | --- | --- | --- | --- | --- | --- | --- | --- | --- |
| (k) Ferric Oxide | 1 | .006 | Potassium Iodide | 12.5 | .075 | Potassium Bisulfate | 15.3 | 112 | +3.1 |
| (l) Ferric Oxide | 1 | .006 | Potassium Iodide | 12.5 | .075 | m-phthalic | 18.7 | .113 | +2.1 |

Compositions with one or more components omitted gave the following results:

| Halide | Parts | Moles | Acid | Parts | Moles | Metal Cpd. | ΔOI |
| --- | --- | --- | --- | --- | --- | --- | --- |
| (m) Potassium Iodide | 12.5 | .075 | Potassium Bisulfate | 15.3 | .112 | None | +1.2 |
| (n) None | — | — | Potassium Bisulfate | 11.6 | .085 | None | +0.8 |

Again, ΔOI comparison shows $(k) > (m) + (i)$.

EXAMPLE 3

Addition of powdered ferric oxide and potassium iodide mixtures to ABS containing the admixed acid shown, gave the results indicated:

| Halide | Parts | Moles | Acid | Parts | Moles | Metal Cpd. | Parts | Moles | ΔOI |
|---|---|---|---|---|---|---|---|---|---|
| (o) Potassium Iodide | 12.5 | .075 | Tartaric | 16.9 | .113 | Ferric Oxide | 1 | .006 | +5.7 |
| (p) Potassium Iodide | 12.5 | .075 | Citric* | 23.7 | .113 | Ferric Oxide | 1 | .006 | +5.8 |

*Monohydrate used throughout.

EXAMPLE 4

Incorporation of a powdered mixture of the components shown into ABS gave the result indicated:

| Halide | Parts | Moles | Acid | Parts | Moles | Metal Cpd. | Parts | Moles | ΔOI |
|---|---|---|---|---|---|---|---|---|---|
| (q) Potassium Iodide | 12.5 | .075 | Adipic | 16.5 | .113 | Ferric Oxide | 1 | .006 | +2.6 |

EXAMPLE 5

This example illustrates that a variety of metallic compounds are operable in combination with acids and halides.

ABS compositions containing the 3 components shown gave the following test results:

| Halide | Parts | Acid | Parts | Moles | Metal Compound | Parts | Moles | OI | ΔOI |
|---|---|---|---|---|---|---|---|---|---|
| (b') None | — | None | — | — | None | — | — | 18.3 | — |
| (c') Potassium Iodide | 12.5 | Citric | 23.7 | .113 | Tris(2,4-pentane-diono)iron | 4.7 | .013 | 19.6 | +1.3 |

Compositions with one or more components omitted gave the following results:

| Halide | Acid | Parts | Moles | Metal Compound | Parts | Moles | ΔOI |
|---|---|---|---|---|---|---|---|
| (z) None | Citric | 23.7 | .113 | Tris(2,4-pentanediono)iron | 4.7 | .013 | +3.0 |
| (a') None | None | — | — | Antimony Trioxide | 10 | .034 | +0.9 |

Note:
The formula $Sb_2O_3$ was used as the basis for calculating moles of antimony trioxide in the above.

ΔOI comparison again shows: $(s) > (g) + (z)$.

Comparison of $(x)$ and $(d)$ illustrates that less than 2 parts of antimony trioxide, when used in combination with acid and halide, makes a contribution (0.9) equivalent to that of 10 parts of the trioxide when used alone $(a')$.

EXAMPLE 6

This example illustrates the use of Styron 666U (a general purpose polystyrene having an Izod Impact Strength of 0.2 ft.lb./in. of Notch at 73° F. and a Vicat Softening Point of 212° F.) as a suitable polymer in which the fire retardant systems of the present invention can be used.

EXAMPLE 7

This example illustrates the use of Lucite 130 (an acrylic resin having an Izod Impact Strength of 0.3 at 73° F., a specific gravity of 1.18, and a deflection temperature (264 psi) of 166° F.) as a suitable polymer in

| Halide | Parts | Moles | Acid | Parts | Moles | Metal Compound | Parts | Moles | ΔOI |
|---|---|---|---|---|---|---|---|---|---|
| (r) Potassium Iodide | 12.5 | .075 | Citric | 23.7 | .113 | Tris(2,4-pentanediono)iron | 4.7 | .013 | +8.3 |
| (s) Sodium Chloride | 4.4 | .075 | Citric | 23.7 | .113 | Tris(2,4-pentanediono)iron | 4.7 | .013 | +5.3 |
| (t) Potassium Iodide | 12.5 | .075 | Succinic | 13.3 | .113 | Tris(2,4-pentanediono)iron | 4.7 | .013 | +4.4 |
| (u) Potassium Iodide | 13.1 | .079 | Citric | 15.3 | .073 | Ferrous Sulfate (crystal) | 3.7 | .013 | +4.9 |
| (v) Potassium Iodide | 13.1 | .079 | Potassium Bisulfate | 10.8 | .079 | Ferrous Sulfate (crystal) | 3.7 | .013 | +1.9 |
| (w) Potassium Iodide | 12.5 | .075 | Succinic | 13.3 | .113 | Stannous Oxide | 2.5 | .019 | +1.9 |
| (x) Potassium Iodide | 12.5 | .075 | Succinic | 13.3 | .113 | Antimony Trioxide | 1.8 | .006 | +1.5 |
| (y) Potassium Iodide | 12.5 | .075 | Citric | 21.6 | .103 | Bis(2,4-pentanediono)nickel dihydrate | 5.5 | .019 | +5.7 |
| (y') Potassium Iodide | 12.5 | .075 | Citric | 23.7 | .113 | Cobalt Oxide ($Co_2O_3$) | 1.0 | .006 | +2.0 |

Note:
The pentanediono compounds are acetylacetonates.

which the fire retardant systems of the present invention can be used.

| Halide | Parts | Acid | Parts | Moles | Metal Compound | Parts | Moles | OI | ΔOI |
|---|---|---|---|---|---|---|---|---|---|
| (d') None | — | None | — | — | None | — | — | 17.7 | — |
| (e') Potassium Iodide | 12.5 | Citric | 23.7 | .113 | Tris(2,4-pentane-diono)iron | 4.7 | .013 | 20.5 | +2.8 |

| Halide | Parts | Moles | Acid | Parts | Moles | Metal Compound | Parts | Moles | OI | ΔOI |
|---|---|---|---|---|---|---|---|---|---|---|
| (h') None | — | — | None | — | — | None | — | — | 19.1 | — |
| (i') Potassium Iodide | 12.5 | .075 | Citric | 23.7 | .113 | Tris(2,4-pentanediono)iron | 4.7 | .013 | 22.5 | +3.4 |

EXAMPLE 8

This example illustrates the use of SBR 1500 (a cold-polymerized, non-pigmented, rosin-acid emulsified, salt-acid coagulated, staining styrene-butadiene rubber of 23.5% target bound styrene) as a suitable polymer in which the fire retardant systems of the present invention can be used:

| Halide | Parts | Moles | Acid | Parts | Moles | Metal Compound | Parts | Moles | OI | ΔOI |
|---|---|---|---|---|---|---|---|---|---|---|
| (f') None | — | — | None | — | — | None | — | — | 18.6 | — |
| (g') Potassium Iodide | 12.5 | .075 | Citric | 23.7 | .113 | Tris(2,4-pentanediono)iron | 4.7 | .013 | 20.0 | +1.4 |

All compositions in Examples 8, 9 and 11 were cured with the following system:

| | |
|---|---|
| Kadox 15 (zinc oxide) | 5 parts |
| Stearic Acid | 1 part |
| MBT (Mercaptobenzothiazole) | 2.5 parts |
| Sulfur | 2 parts |

Slab specimens were compression molded for two hours at 330° F. Specimens were cut to size for testing.

Compounding of rubbers was carried out conventionally on a rubber mill with cool rolls. Molded specimens were cooled prior to removal from press.

EXAMPLE 9

This example illustrates the use of Paracril BLT (butadiene-acrylonitrile copolymer rubber of medium nitrile content; specific gravity of 0.99; Mooney viscosity (ML-2 at 212° F.) of 80–90) as a suitable polymer in which the fire retardant systems of the present invention can be used:

EXAMPLE 10

This example illustrates the use of Profax 6523 (propylene homopolymer having a Rockwell Hardness (R) of 102 and a Deflection Temperature (264 psi) of 58° C.) as a suitable polymer in which the fire retardant systems of the present invention can be used:

| Halide | Parts | Moles | Acid | Parts | Moles | Metal Compound | Parts | Moles | OI | ΔOI |
|---|---|---|---|---|---|---|---|---|---|---|
| (j') None | — | — | None | — | — | None | — | — | 17.2 | — |
| (k') Potassium Iodide | 12.5 | .075 | Citric | 23.7 | .113 | Tris(2,4-pentanediono)iron | 4.7 | .013 | 18.3 | +1.1 |

EXAMPLE 11

This example illustrates the use of Royalene 501 (a low gravity, fast-curing, light-colored, non-staining ethylene/propylene/non-conjugated diene rubber polymer) as a suitable polymer in which the fire retardant systems of the present invention can be used:

| Halide | Parts | Moles | Acid | Parts | Moles | Metal Compound | Parts | Moles | OI | ΔOI |
|---|---|---|---|---|---|---|---|---|---|---|
| (l') None | — | — | None | — | — | None | — | — | 18.2 | — |
| (m') Potassium Iodide | 12.5 | .075 | Citric | 23.7 | .113 | Tris(2,4-pentanediono)iron | 4.7 | .013 | 20.1 | +1.9 |

The m' sample sponged upon mold release, slowly returning to correct gauge for testing. While the overall formulation used is non-commercial, the example does illustrate that the flame retardant system of this invention is operative in EPDM rubbers.

COMPARATIVE RESULTS WITH RECOGNIZED FLAME-RETARDANT ADDITIVES:

The following are some comparative results obtained in ABS polymer with typical commercial flame retardant additives:

| Additive (pph) | Moles Halogen | ΔOI |
| --- | --- | --- |
| Poly (vinyl chloride)* (5) | .079 | +2.3 |
| Cloran** (5) | .071 | +1.0 |
| Cloran (5) + Antimony Trioxide (5) | .071 | +2.8 |
| Cloran (5) + Antimony Trioxide (11) | .071 | +3.9 |

*stabilized with an organotin additive
** trademark denoting product of UOP Chemical Company Comparison with Example 5 shows that, at equimolar halogen contents, the combinations of the present invention compare quite favorably in flame retardant effectiveness with additives of the organic halogen type used either alone or in combination with antimony trioxide.

Having thus described my invention what I claim and desire to protect by Letters Patent is:

1. A composition comprising an organic polymer selected from the group consisting of hydrocarbon polymers, nitrile-containing polymers, carboxylic-containing polymers and carboxylate ester-containing polymers and an effective flame retardant amount of: (a) a compound selected from the group consisting of the oxides, sulfates, carbonates, acetylacetonates, and carboxylates of iron, cobalt, nickel, tin and antimony and the bis-cyclopentadienyl compounds of iron, cobalt and nickel, said carboxylates being the salts of an acid selected from the group consisting of acetic, oxalic, tartaric and citric acids; and (b) an alkali metal halide selected from the group consisting of chlorides, bromides and iodides; and (c) from about 25% by weight to about 325% by weight, based on chemical equivalency to the sum of the amounts of compound (a) and halide (b), of a compound selected from the group consisting of succinic, glutaric, adipic, pimelic, suberic, tartaric, m-phthalic and citric acids, mono- and dialkyl phosphonic and phosphoric acids, organic sulfonic acids having an acid ionization constant in excess of $10^{-6}$ and which is substantially non-volatile at conventional polymer processing temperatures, and potassium bisulfate, except that the amount of component (c) is based only on equivalency with the amount of halide (b) in the case in which compound (a) is a salt of an acid having the same ionization constant as or a higher ionization constant than that of component (c); compound (a) being present in an amount which is about 5 to about 100% by weight of the amount chemically equivalent to the halogen atoms present.

2. The composition of claim 1 in which said organic polymer is an ABS plastic.

3. The composition of claim 1 in which said organic polymer is polystyrene.

4. The composition of claim 1 in which said organic polymer is an acrylic resin.

5. The composition of claim 1 in which said organic polymer is a styrene-butadiene copolymer.

6. The composition of claim 1 in which said organic polymer is an acrylonitrile/butadiene copolymer.

7. A masterbatch comprising from about 10 to about 75%, based on the total weight of the masterbatch, of an organic polymer selected from the group consisting of hydrocarbon polymers, nitrile-containing polymers, carboxylic-containing polymers and carboxylate ester-containing polymers and from about 90 to about 25%, based on the total weight of the masterbatch, of a flame retardant composition comprising: (a) a compound selected from the group consisting of the oxides, sulfates, carbonates, acetylacetonates, and carboxylates of iron, cobalt, nickel, tin and antimony and the bis-cyclopentadienyl compounds of iron, cobalt and nickel, said carboxylates being the salts of an acid selected from the group consisting of acetic, oxalic, tartaric and citric acids; and (b) an alkali metal halide selected from the group consisting of chlorides, bromides and iodides; and (c) from about 25% by weight to about 325% by weight, based on chemical equivalency to the sum of the amounts of compound (a) and halide (b), of a compound selected from the group consisting of succinic, glutaric, adipic, pimelic, suberic, tartaric, m-phthalic and citric acids, mono- and dialkyl phosphonic and phosphoric acids, organic sulfonic acids having an acid ionization constant in excess of $10^{-6}$ and which is substantially non-volatile at conventional polymer processing temperatures, and potassium bisulfate, except that the amount of component (c) is based only on equivalency with the amount of halide (b) in the case in which compound (a) is a salt of an acid having the same ionization constant as or a higher ionization constant than that of component (c); compound (a) being present in an amount which is about 5 to about 100% by weight of the amount chemically equivalent to the halogen atoms present.

* * * * *